Dec. 5, 1933.   J. R. OISHEI ET AL   1,938,350
REAR VISION MIRROR SUPPORT
Filed July 23, 1931
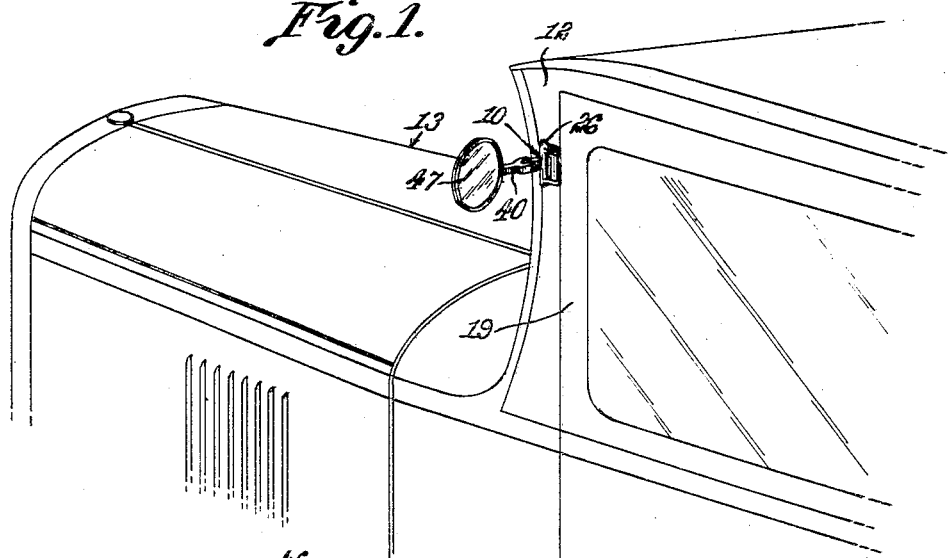
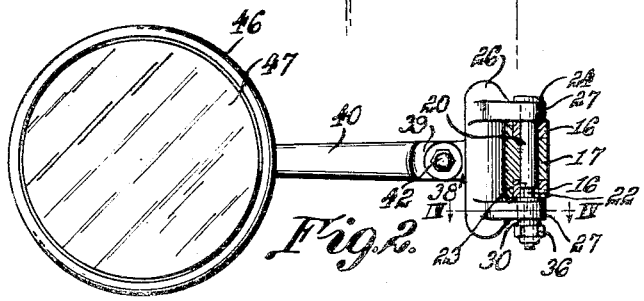
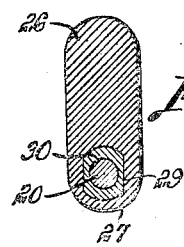
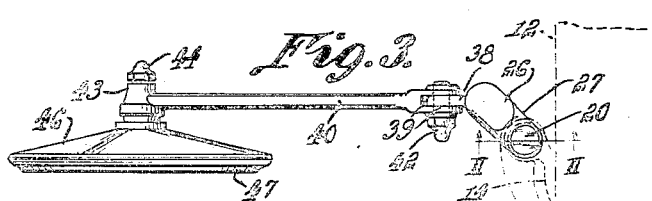
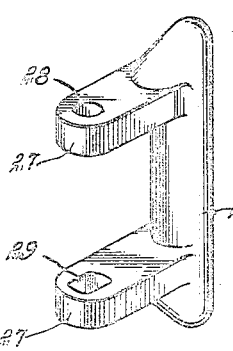
Inventor
John R. Oishei,
Earl V. Schaal,
By Bean, Brooks & Henry
Attorney Patented Dec. 5, 1933

1,938,350

UNITED STATES PATENT OFFICE 1,938,350

REAR VISION MIRROR SUPPORT

John R. Oishei and Earl V. Schaal, Buffalo, N. Y., assignors to Trico Products Corporation, Buffalo, N. Y.

Application July 23, 1931. Serial No. 552,758

2 Claims. (Cl. 248—20)

This invention relates to rear vision mirrors for motor vehicles and it has particular relation to a hinge construction for such mirrors.

Since automobiles are not generally equipped originally with outside rear vision mirrors, a majority of drivers must depend upon the conventional rear vision mirrors that are installed in front of the driver's seat upon the upper inside front frame rail of the vehicle. While this type of mirror serves the purpose of affording vision through the rear window of an automobile a second mirror arranged adjacent the driver's seat outside the automobile is also of great aid to a driver in operating a motor vehicle in present day traffic. It is desirable to provide this type of outside rear vision mirror as an attachment and accordingly it should be inexpensive, easily attached at the proper location, and positive in its adjustment in order to be acceptable as a commercial article.

According to this invention a bracket construction is provided which is adapted to be secured directly to the hinge members of an automobile door, and features are included whereby the door may be opened or closed without altering the position of the mirror. A special bolt is employed which is substituted for the conventional hinge bolt and the entire attachment can be installed without otherwise altering in any way the existing construction of an automobile.

For a better understanding of the invention reference may now be had to the accompanying drawing forming a part of this specification of which Fig. 1 is a fragmentary perspective showing in outline of an automobile with a device constructed according to the invention mounted thereon;

Fig. 2 is an elevation, on a larger scale, of a mirror hinge and connections therefor, a portion of the device being shown in cross-section substantially along the line II—II of Fig. 3;

Fig. 3 is a plan view of the device shown in Fig. 2;

Fig. 4 is a cross-section, on a larger scale, taken substantially along the line IV—IV of Fig. 2;

Fig. 5 is a perspective, on a larger scale, of one of the hinge elements of the device; and Fig. 6 is a perspective, on a larger scale, of one of the hinge elements.

In practicing the invention a mirror hinge construction 10 is mounted upon a body 12 on an automobile 13 adjacent one side thereof for the purpose of reflecting to the driver the images of vehicles at the rear or side of the automobile. A stationary hinge member 14 (Fig. 3) rigidly mounted upon the body 12 is provided with knuckles 16 integral therewith for receiving a knuckle or tongue 17 of a hinge member 18 that cooperates with the other hinge member. The hinge member 18 is rigidly mounted upon the door 19 of the automobile.

In order to maintain the hinge members in proper operative position a hinge bolt 20 is substituted for the conventional hinge bolt (not shown) and it extends through the knuckles 16 and through the tongue 17. The lower end portion of the bolt has a shank 22 of relatively small diameter that terminates in a shoulder 23 at an intermediate portion of the bolt. The upper end of the bolt is provided with a suitable head 24.

A rear vision mirror bracket 26 having integral ears 27 spaced a distance slightly greater than the distance between the outer surfaces of the integral knuckles 16 is provided with a circular opening 28 in the upper ear and irregular opening 29 in the lower ear. A sleeve 30 having an irregular shank 32 corresponding in shape to the irregular opening 29 is also provided with an upper circular head or flange 33, and a central bore 34 for receiving the smaller shank of the bolt 20. The shank 32 of the sleeve projects downwardly from the lower ear 29 while the flange 33 rests upon the upper surface thereof. A nut 36 secured in threaded relation upon the end of the shank 22 of the bolt 20 abuts the lower end of the sleeve and binds the flange 33 firmly against the lower portion of the lower knuckle 16. It will be apparent that the sleeve 30 serves as a spacing and clamping member for receiving the lower bracket ear 27 in spaced relation with respect to the nut 36 and lower knuckle 16, and in cooperation with the bolt 20 and nut 36, this sleeve clamps the upper ear 27 against the upper knuckle 16.

In the assembled relation of the elements just described the hinge bolt 20 maintains the bracket 26 and the stationary hinge members 16 firmly but frictionally clamped together for relative pivotal movement in a horizontal plane by manually turning the bracket 26. Thus the upper ear 27 of the bracket 26 and the flange 33 of the sleeve 30 which engages the lower ear 16 are firmly clamped by the bolt and nut 36 against the opposite outer surfaces of the integral stationary knuckles 16. The shoulder 23 is disposed within the lower knuckle 16 intermediate the opposite surfaces thereof. The lower portion of the bolt has a smaller diameter in order that the sleeve 30 can be constructed of such size as to correspond in proper proportion to the other elements that cooperate with it.

In adjusting the bracket rotatably about the bolt 20, the sleeve 30 turns with the bracket, whereas by opening or closing the door 19 the movable hinge member 18 turns about the bolt 20 which is held stationary during this operation.

A lug 38 integral with the bracket 26 extending in substantially the opposite direction from the ears 27 receives integral bifurcations 39 of a mirror supporting arm 40. These bifurcations are pivoted by means of a bolt 42 to the lug 38. It will be observed that the axis of the bolt 42 is disposed at right angles to the axis of the bolt 20. The outer end of the arm is provided with an integral head 43 through which a bolt 44 extends for engaging and rigidly supporting a mirror frame 46 having a mirror 47 secured therein.

From the foregoing description it will be apparent that the arm 40 may be pivotally adjusted in vertical plane about the bolt 42 while it may be pivotally adjusted in a horizontal plane about the bolt 20. Thus the mirror may be manually positioned at any angle desired with respect to the line of vision of the automobile driver. It is to be understood that the bifurcations 39 are sufficiently resilient to engage the lug 38 frictionally in order that the arm can be retained firmly in the position to which it is manually moved. Accordingly when the proper desired position is located the mirror will remain in that position regardless of vibration or of the opening and closing of the door of the automobile.

Although only one form of the invention has been shown and described in detail it will be apparent to those skilled in the art that the invention is not so limited but that various changes may be made therein without departing from the spirit of the invention or from the scope of the appended claims.

What is claimed is:

1. A bracket for attachment to an automobile hinge, comprising a bracket member formed with a lug for attaching a mirror thereto and a pair of spaced apertured ears, one of said ears engaging a stationary part of said hinge and the companion ear being spaced from another stationary part of said hinge, a bolt extending through said ears and said hinge, said bolt having a head engaging the one ear and a reduced threaded shank extending beyond the companion ear, a sleeve slidably mounted in said companion ear and on said shank, said sleeve being of non-circular cross section and engaging in a non-circular opening in said ear for movement therewith and a flanged portion engaging a stationary part of said hinge, and a nut threaded on said shank against one end of said sleeve, whereby the one ear and the flanged portion cooperate to maintain said bracket in an adjusted position on said hinge and permit independent movement of a movable part of said hinge.

2. An adjustable bracket for attachment to an automobile door hinge having a pair of spaced stationary knuckles and an intermediate movable knuckle, comprising a bracket member formed with a pair of spaced ears, one of said ears engaging one of said stationary knuckles and the companion ear being spaced from the other stationary knuckle, a bolt extending through the hinge and the ears, said bolt having a head engaging the one ear and a threaded shank extending beyond the companion ear, a sleeve slidably mounted in said companion ear and on said shank, said sleeve having a non-circular portion engaging said ear for movement therewith and a head portion engaging the other of said stationary knuckles, and means threaded on said shank against one end of said sleeve, whereby the one ear and the head of the sleeve cooperatively engage the stationary knuckles of the hinge to maintain said bracket in an adjusted position and permit independent movement of the movable knuckle.

JOHN R. OISHEI.
EARL V. SCHAAL.